United States Patent [19]

Hunter

[11] 4,109,609
[45] Aug. 29, 1978

[54] VACUUM-PRESSURIZED IMMERSION COATER

[75] Inventor: Edward E. Hunter, Akron, Ohio

[73] Assignee: The Goodyear Tire & Rubber Company, Akron, Ohio

[21] Appl. No.: 682,710

[22] Filed: May 3, 1976

[51] Int. Cl.² .................................................. B05C 3/10
[52] U.S. Cl. ................................... 118/50; 118/64; 118/429; 118/500; 214/17 B
[58] Field of Search .......... 118/50, 50.1, 64, 48–49.5, 118/429, 500; 427/294–298, 236, 238; 214/17 B

[56] References Cited

U.S. PATENT DOCUMENTS

| 2,124,162 | 7/1938 | Eddison et al. | 118/50 X |
| 2,858,795 | 11/1958 | Walker | 118/50 |
| 3,801,360 | 4/1974 | Dahlgren | 118/50 X |
| 3,895,138 | 7/1975 | Sewell et al. | 118/50 X |

FOREIGN PATENT DOCUMENTS 838,515 12/1938 France ....................... 118/49

Primary Examiner—Morris Kaplan
Attorney, Agent, or Firm—Frederick K. Lacher; R. S. Washburn

[57] ABSTRACT

A device for coating wire tire cord on a spool with an agent for increasing the bond between the wire tire cord and rubber material used in the production of tires. The device is composed of at least one hollow pipe which forms a chamber in which the spools of wire are coated. A hydraulic cylinder is provided adjacent the mouth of the pipe to engage and push a number of spools, in tandem, through the pipe in axially aligned, end-to-end relation. Means are supplied for circulating a liquid, containing the agent, into the chamber and for alternately creating a vacuum and pressure within the chamber to increase penetration of the liquid coating into the interstices between segments of wire cord wrapped on the spools. Other means are provided for circulating a heated fluid in the chamber to dry the liquid coating on the wire of each spool being treated.

3 Claims, 4 Drawing Figures

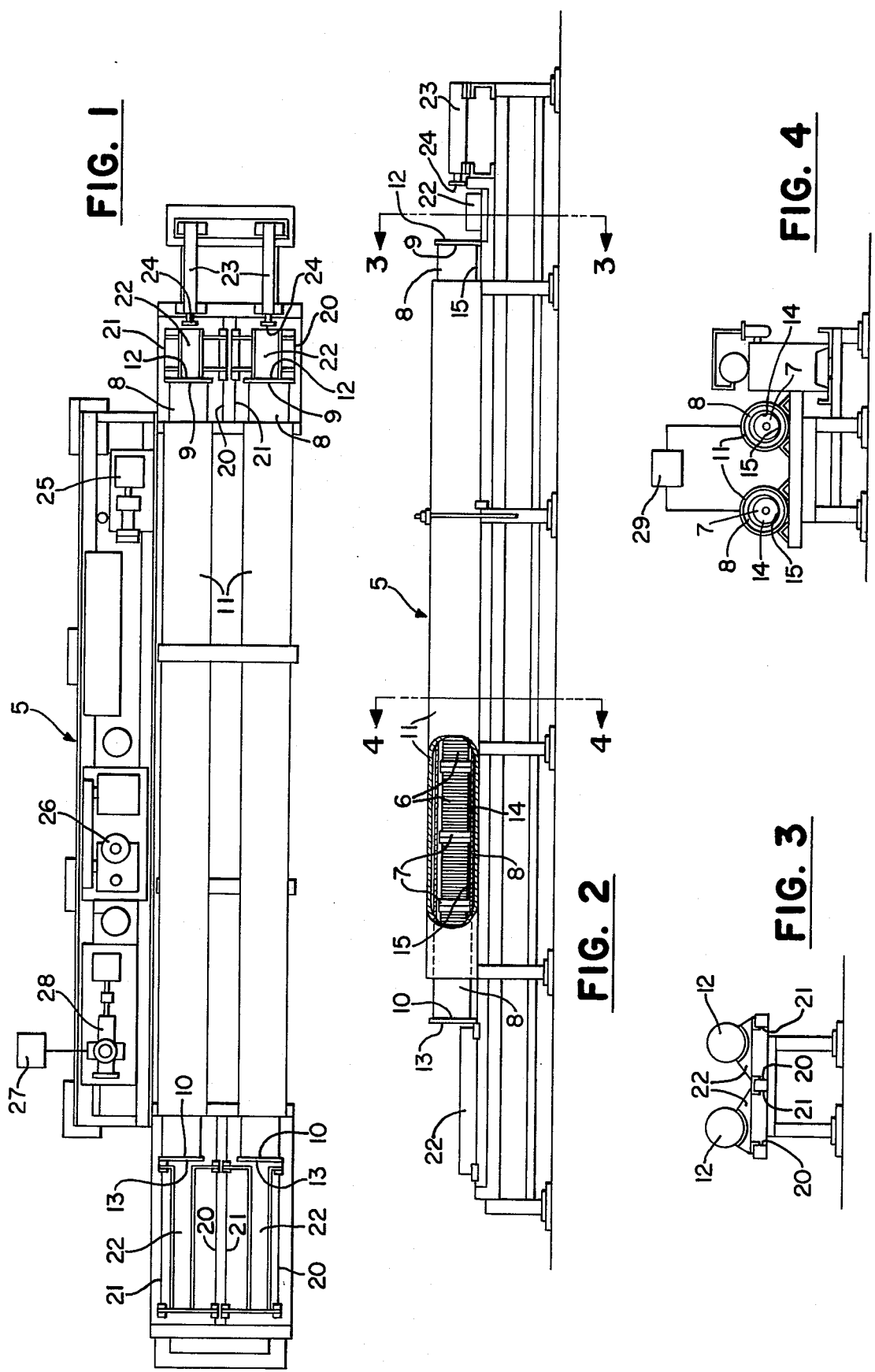

VACUUM-PRESSURIZED IMMERSION COATER

BACKGROUND OF THE INVENTION

The invention is particularly well suited for coating wire tire cord wound on a spool, although the technology involved is also applicable to coating textile cord wound on a spool. It has been found cheaper and more convenient, from a handling standpoint, to coat the wire when it is on a spool, rather than removing the wire from the spool before coating it.

Coiled wire armatures for motors have been coated by dipping them in vertically disposed vats of liquid coating material. In such cases, the armatures are first placed under a vacuum to remove any moisture from the wire. The vacuum is gradually decreased as the vat is slowly filled with liquid coating, under pressure, the pressure being utilized to increase penetration of the liquid coating into the interstices of the armature. It is necessary to lift these armatures into and out of the vats, thereby necessitating the use of expensive cranes and other equipment for handling the armatures, especially those of very large motors. Spools of wire tire cord are also large and difficult to handle. The invention is directed to providing a highly simplified apparatus in which spools of wire can be more conveniently handled as they are coated with a liquid.

Briefly stated, the invention is in an apparatus for coating a continuous element, such as a wire tire cord, while it is wound on a spool used in the storage and transportation of the element. The apparatus comprises a generally horizontally elongated chamber which is sealable from the ambient atmosphere. A trackway is provided for guiding spools axially through the chamber. Means are supplied for moving the spools, in tandem, along the trackway in axially aligned end-to-end relation. Means are utilized for circulating liquid coating into the chamber. Means are also provided for alternately creating a vacuum and pressure within the chamber to increase penetration of the liquid coating into the interstices or voids between adjacent segments of the elements wound on the spools, and for drying the liquid coating on the elements of the spools.

DESCRIPTION OF THE DRAWING

The following description of the drawing will be better understood by having reference to the annexed drawing, wherein:

FIG. 1 is a plan view of a wire-treating apparatus made in accordance with the invention;

FIG. 2 is a side view of the apparatus with parts being broken away to show the spools in the chamber;

FIG. 3 is a section of the apparatus viewed from the lines 3—3 of FIG. 2; and

FIG. 4 is a section of the apparatus viewed from the line 4—4 of FIG. 2.

DETAILED DESCRIPTION OF THE INVENTION

With reference to the drawing, there is shown an apparatus 5 used in coating continuous elements, e.g. wire tire cord 6 wound on spools 7 (FIG. 2), with an agent for increasing the bond between the wire tire cord 6 and rubber material used in the production of tires. The wire coating apparatus 5 comprises a pair of parallel, identical, hollow cylindrical tubes or pipes 8, each of which has opposing entrance and exit openings 9, 10. Each of the pipes 8 is surrounded by a thermally insulated jacket 11 for receiving a heated fluid, e.g. steam, to heat the pipes 8. A front cover plate 12 is hinged to each of the mouths or entrance openings 9 of the pipes 8, and a rear cover plate 13 is hinged to each of the exit openings 10 of the pipes 8 to seal the treatment chambers 14, formed within the pipes 8, from the ambient atmosphere. The pipes 8 are supported from the floor of a factory building by a frame having a number of increasingly shorter legs from the mouths 9 of the pipes 8, such that the pipes 8 decline slightly from the horizontal for the purpose of allowing liquid trapped within the chambers 14 to flow out the exit openings 10 when the rear cover plates 12 are removed. The curved bottoms 15 of the pipes 8 act as trackways for supporting and guiding the spools 7 of wire 6 through the pipes 8 and chambers 14 in end-to-end, axially aligned relation.

A pair of guide rails 20 and 21 extend in parallel relation at the entrance and exit openings 9 and 10 of the pipes 8. A cradle 22 for holding and supporting one or more spools 7 of wire tire cord 6, is removably mounted on each of the pairs of guide rails 20, 21. The cradles 22 are movable along the guide rails 20, 21 such that the front and rear cover plates 12 and 13 can be rotated to positions where they will not interfere with movement of the spools 7 of wire 6 into and out of the pipes 8.

A hydraulic cylinder 23 with a reciprocable piston is provided in axial, spaced relation from the mouth 9 of each of the pipes 8. Attached to each of the pistons exteriorly of the hydraulic cylinders 23, is a pusher head 24 for engaging and pushing spools 7 of wire 6, placed on the cradles 22 adjacent the mouths 9 into the pipes 8. A hydraulic unit 25, including a supply reservoir, pump and motor, is provided for operating the hydraulic cylinders 23. A number of spools 7 of wire 6 are successively pushed, in tandem, into each of the pipes 8 until they are filled. The cover plates or doors 12, 13 are positioned to seal the chambers 14 of the pipes 8 from the ambient atmosphere.

A vacuum is created within each of the chambers 14 by any suitable pumping device 26 to remove any moisture which has collected on the wire 6 of the spools 7. Liquid coating is then circulated, under pressure, into each of the treatment chambers 14 from a source of supply 27 by any appropriate pumping mechanism 28. Simultaneously, the vacuum within each of treatment chambers 14 is gradually decreased and the liquid pressure increased to facilitate penetration of the liquid coating into the interstices between adjacent segments of wire 6 on the spools 7. A desired liquid pressure can be maintained within the treatment chambers 14, or a vacuum alternately created to help increase the penetration of the liquid coating. Excess liquid coating is drained from the treatment chambers 14 by the pumping mechanism 28 after the wire 6 on the spools 7 has been thoroughly coated or covered. Steam is then circulated through the jackets 11 by any appropriate pumping and heating device 29 to heat the pipes 8 and subsequently dry the liquid coating on the wire 6 of the spools 7 disposed within the treatment chambers 14. Simultaneously, a vacuum is created within the pipes 8 to facilitate drying of the liquid coating. After the drying operation is completed, the rear cover plates 13 are removed and the cradles or spool supports 22 moved into position adjacent the exit openings 10 to receive spools 7 of wire 6 thrust from the pipes 8 by new spools 7 of wire 6 being pushed into the chambers 14. The transverse cross section and inside diameters of the pipes 8 are slightly larger than the transverse cross section and overall diameters of the spools 7 of wire 6 to insure that the spools 7 move smoothly and unhampered through the pipes 8 as shown in FIGS. 2 and 3. Ramps (not shown) can be utilized for conveying spools 7 of wire 6 to and from the cradles 22.

Thus, there has been provided a highly improved device for coating wire tire cord wrapped on a spool on which the tire cord is stored and transported. An apparatus and method for similarly treating a number of spools of wire in a horizontally elongated pipe wherein the spools are caused to roll, by gravity, is described in copending application Ser. No. 682,709, filed on the same date as this application.

What is claimed is:

1. An apparatus for coating a continuous element, such as a wire tire cord while in the wound condition on a spool, comprising:
   (a) at least one elongated chamber having openings at opposing ends, cover plate members at said ends to permit the passage of said spool and for sealing from the ambient atmosphere, said chamber having a length to accomodate a plurality of spools in end-to-end relationship and having a transverse cross section larger than the transverse cross section of said spool;
   (b) a trackway extending longitudinally of said chamber for guiding said spool through the chamber along a generally horizontal pathway;
   (c) means for moving said spool along the trackway in axially aligned, end-to-end relation with other spools on the trackway;
   (d) means for circulating liquid coating to the chamber;
   (e) means for creating at least a partial vacuum in the chamber;
   (f) means coacting with the vacuum creating means (e) for alternately creating fluid pressure in the chamber;
   (g) said means for moving includes a cylinder disposed exteriorly of the pipe adjacent said opening in the pipe through which the spools pass into the chamber, a piston reciprocable within the cylinder, and means connected to the piston and disposed exteriorly of the cylinder for engaging said spool and moving it into the pipe when one of said cover plate members is removed from said opening;
   (h) means disposed adjacent each of the opposing ends of the pipe for supporting at least one spool; and
   (i) means for mounting the spool support means (h) for movement to and from said adjacent opposing ends of the pipe and in cooperative relationship with said means for moving (c); whereby the spools are positioned for entry into the mouth of the pipe and caught at the exit the pipe.

2. The apparatus of claim 1, wherein the trackway is formed by the curved bottom of the pipe when the pipe is disposed in a generally horizontal position.

3. The apparatus of claim 1, which includes a second pipe in parallel relation to said first mentioned pipe and having a second chamber for receiving a said spool, said second pipe having a second opening for entry of a said spool adjacent said first mentioned opening and a second exit opening at an opposing end adjacent said first mentioned opening at the opposing end of said first mentioned pipe for a said spool as it exits said second mentioned pipe so that the spools may be positioned for entry into both the pipes in the same general area and caught in the same general area as they exit the pipes.

* * * * *